March 31, 1964    L. H. CRUSE    3,127,149
VALVED HOSE COUPLINGS
Filed April 17, 1963    2 Sheets-Sheet 1

INVENTOR.
LEE H. CRUSE
BY
*Alfred W. Petchaft*
ATTORNEY

March 31, 1964  L. H. CRUSE  3,127,149
VALVED HOSE COUPLINGS
Filed April 17, 1963  2 Sheets-Sheet 2
FIG. 5  FIG. 6  FIG. 7
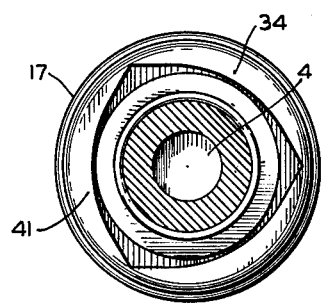 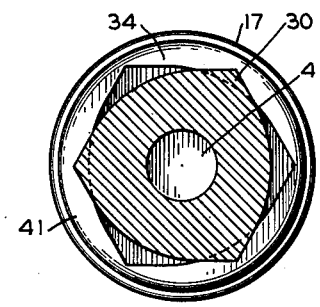 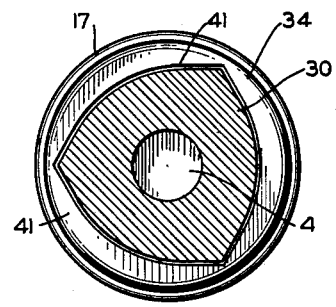
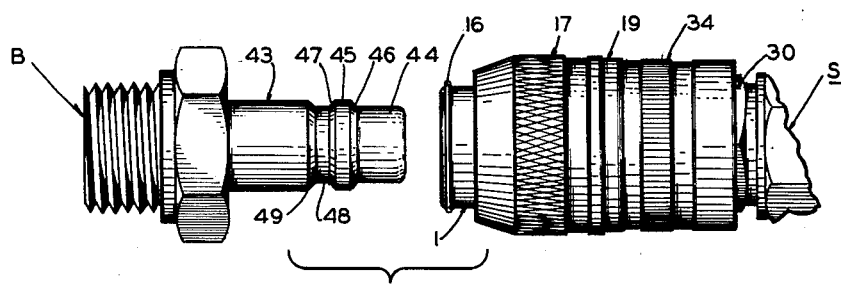
FIG. 8
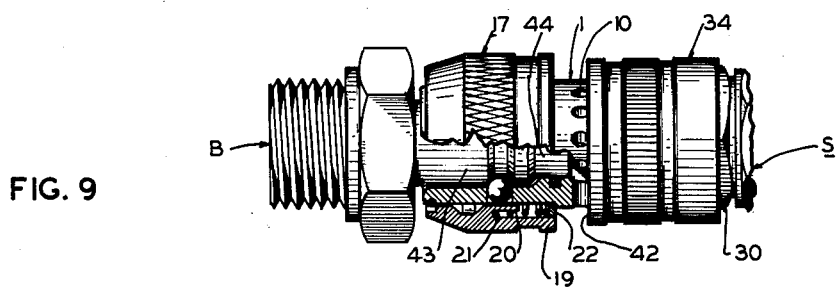
FIG. 9
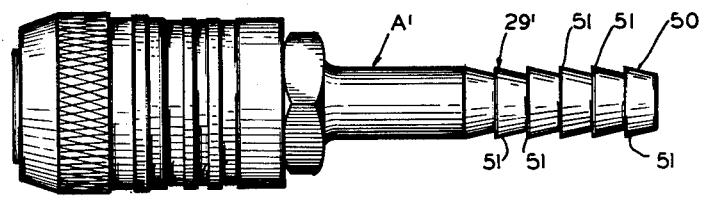
FIG. 10
INVENTOR
LEE H. CRUSE
BY
Alfred W. Petchaft
ATTORNEY

United States Patent Office 3,127,149
Patented Mar. 31, 1964

3,127,149
VALVED HOSE COUPLINGS
Lee H. Cruse, Springfield, Mo., assignor to Foster Manufacturing Co., Inc., St. Louis, Mo., a corporation of Missouri
Filed Apr. 17, 1963, Ser. No. 273,753
10 Claims. (Cl. 251—149.9)

This invention relates to certain new and useful improvements in hose couplings and, more particularly, to a quick-action hose coupling for connecting high pressure air lines of the type usually associated with pneumatic systems.

The primary object of the present invention is to provide a hose coupling of the type stated which is extremely simple in operation and can be easily manipulated to establish a quick, secure, leak-proof connection between two air lines.

It is another object of the present invention to provide a hose coupling of the type stated which includes manually operable valve means for controlling the flow of air under pressure through the coupling between two air lines interconnected thereby.

It is a further object of the present invention to provide a hose coupling of the type stated which is simple and economical in construction consisting of a comparatively small number of component parts uniformly designed for simple, rapid assembly.

It is also an object of the present invention to provide a hose coupling of the type stated which includes valve means capable of being locked in open position so as to permit flow of air through the coupling and being arranged in such a manner, when locked, as to prevent unauthorized, or accidental, disconnection of the hose-element, or male coupler, engaged therein.

It is an additional object of the present invention to provide a hose coupling of the type stated having valve means incorporated therein for optionally permitting and preventing air flow through the coupling, which valve means is readily operable by axially shifting movement.

It is a further object of the present invention to provide a hose coupling of the type stated which is compact and relatively short in length as compared with comparable hose couplings of conventional construction.

It is another object of the present invention to provide a hose coupling of the type stated which is rugged, durable, and will withstand hard use under the most adverse conditions.

With the above and other objects in view, my invention resides in the novel features of form, construction, arrangement, and combination of parts presently described and pointed out in the claims.

In the accompanying drawings (two sheets):

Figure 1:
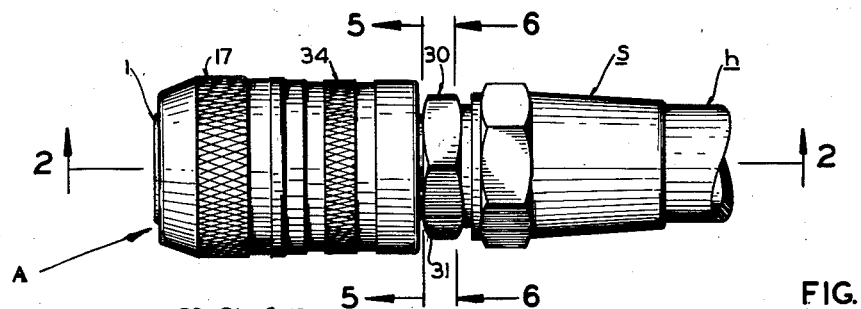
FIG. 1 is an elevational view of a hose coupling constructed in accordance with and embodying the present invention with the valve means shown in open and locked position.

FIGS. 5 and 6 are transverse sectional views taken along lines 5—5 and 6—6, respectively, of FIG. 1;

FIG. 7 is a transverse sectional view substantially similar to FIG. 6, except that the valve means is shown in unlocked position;

FIG. 8 is a fragmentary elevational view of the hose coupling in association with a male coupler about to be inserted therein;

FIG. 9 is an elevational view, partly broken away and in section, of the hose coupling and male coupler in coupled relationship; and FIG. 10 is an elevational view of a modified form of hose coupling constructed in accordance with and embodying the present invention.

Figure 2:
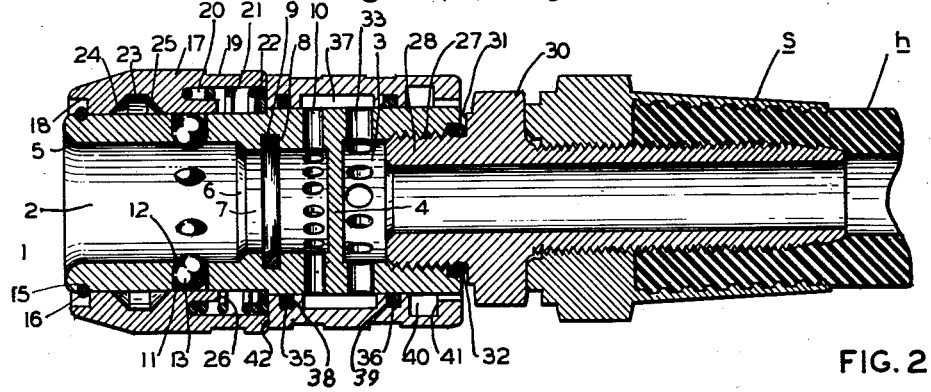
FIG. 2 is a longitudinal sectional view taken along line 2—2 of FIG. 1.
Figure 3:
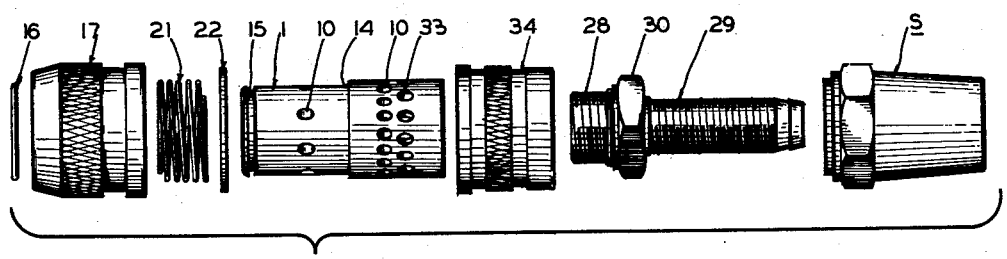
FIG. 3 is an exploded view of the hose coupling illustrating the principal component parts and the manner of assembly thereof, the O-rings and detent-forming balls being omitted for purposes of clarity.

Referring now in more detail and by reference characters to the drawings, which illustrate practical embodiments of the present invention, A designates a hose coupling comprising a tubular body member or barrel 1 including a forward bore 2 and a rearward bore 3, separated by an integral imperforate partition or wall 4, the bores 2, 3, preferably being coaxial. At its forward end, that is to say, the left end, as shown in FIG. 2, the barrel 1 is rounded off and faired outwardly in the provision of a short bell-mouth 5. Inwardly therefrom, the bore 2 is provided with a beveled face 6 and annular shoulder 7, the inner portion of which is defined by an annular seating groove 8 which retains a resilient O-ring 9. As may be seen by reference to FIG. 2, the groove 8 has an axial width equal to the diameter of the O-ring 9 but is shallower in depth than the diameter of the O-ring 9. Consequently, when the O-ring 9 is seated within the groove 8, it will project annularly inwardly beyond the innermost cylindrical surface of the diametrally reduced inner portion of the bore 2 for purposes presently more fully appearing.

In the region between the wall 4 and the O-ring 9, the barrel 1 is provided with a uniformly spaced series of radial apertures or ports 10. Similarly, in the region which is located forwardly of the beveled face 6 the barrel 1 is provided with another series of uniformly spaced radial bores 11 which are of reduced diameter at their inner ends 12 for retaining steel balls 13. As may be seen by reference to FIG. 2, the balls 13 are slightly smaller in diametral size than the diametral size of the main portion of the bore 11, but considerably larger than the smaller diametral size of the internal ends thereof. Moreover, the diametral size of the balls 13 is substantially greater than the radial thickness of the barrel portion in the region of said bores 11. Thus, the balls 13 will move freely in a radial direction within the bores 11 and will project inwardly beyond the cylindrical surface of the bore 2.

On its outer face the forward portion of the barrel 1 is turned down slightly so that it is of somewhat smaller diametral size than the rearward portion thereof, and is separated from the rearward portion by an annular shoulder 14. At its forward end the body portion is provided with an annular groove 15 adapted for receiving a split locking ring 16 formed of spring steel wire or other similar material, and adapted to snap retentively in place within the groove 15. Mounted for snug-fitting and axially slidable movement externally upon the forward portion of the barrel 1 is an actuator sleeve 17, counterbored at its forward end to provide an internal annular groove 18 adapted to seat around and clear the locking ring 16. At its opposite or rear end, the actuator sleeve 17 is counterbored to provide a diametrally enlarged skirt 19 which extends forwardly and becomes one wall or a trepanned groove 20. Seated within the groove 20 and extending axially rearwardly along the interior of the skirt 19 is a compression spring 21 which is abuttingly seated at its rear end against a thin washer 22 which fits snugly around the rearward portion of the barrel 1 and abuts against the shoulder 14. It will be noted that the external diametral size of the washer 22 is slightly smaller than the interior diameter of the skirt 19 and, consequently, the washer 22 will act as a rear stop or abutment for the spring 21 but will not impede axial shifting movement of the sleeve 17. Intermediate the trepanned groove 20 and the forward clearance groove 18, the sleeve 17 is internally undercut in the provision of a clearance groove 23 having forward and rearward tapered surfaces 24, 25. The trepanned groove 20 is of such depth, and the spring 21 is of such size, that when the sleeve 17 is shifted rearwardly, the spring 21 will be compressed and entirely housed within the trepanned groove 20, and the rearwardly presented inner face 26, which is the interior boundary of the trepanned groove 20, will abut in stop-forming manner against the washer 22. The groove 23 is so located that when the sleeve is axially shifted to, and manually held in, this rearwardmost position, the groove 23 will be in overlying registration with the balls 13, as a result of which the balls 13 are free to move radially outwardly until the interior portions of their surfaces are entirely clear of the interior cylindrical surface of the bore 2. On the other hand, when the sleeve 17 is released, it will be shifted forwardly by means of the spring 21, as shown in FIG. 2. In the course of this movement, the surface 25 of the groove 23 will cam the balls 13 inwardly and they will be held in this inward position by the interior surfaces of the sleeve 17, as shown in FIG. 2. The bore 3 is internally threaded at its rearward end and counterbored to provide annular recesses 27 adapted for receiving the threaded end 28 of a tubular fitting 29, which integrally includes a diametrally enlarged nut portion 30 having an axially presented abutment annular face or shoulder 31. As will be seen by reference to FIGS. 6 and 7, the external surfaces of the nut portion 30 are cross-sectionally contoured to the shape of a somewhat symmetrical three-pointed star having arcuate side faces. In other words, the external faces of the nut portion 30 somewhat resemble an equilateral triangle in which the sides extending between the apices are circular arcs rather than straight lines.

Figure 4:
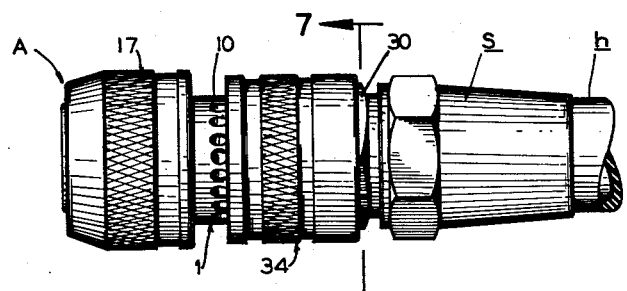
FIG. 4 is an elevational view of the hose coupling similar to FIG. 1, except that the valve means is shown in closed position.

Disposed in snug-fitting, seal-forming position within the recesses 27 and against the shoulder 31 is an O-ring 32. The threaded end 28 of the fitting is substantially shorter in axial length than the bore 3 and terminates a substantial distance rearwardly from the partition or wall 4. In the region between the wall 4 and the threaded end 28 of the fitting 29 the barrel 1 is provided with a uniformly spaced series of radial ports 33. Slidably mounted externally upon the rear portion of the barrel 1 is a valve-forming sleeve 34 which fits snugly and slidably upon the barrel 1 and is internally undercut to provide two axially spaced narrow grooves 35, 36, and an intermediate relatively wide groove or channel 37. Fitted within the narrow grooves 35, 36, are O-rings 38, 39, which slidably, but, nevertheless, snugly engage the outer surfaces of the barrel 1 so as to provide seals for the groove or channel. This groove or channel 37 is axially wide enough so as to extend across the ports 10 and 33 to establish communication therebetween, when the valve-forming sleeve 34 is axially shifted to its forwardmost position, as shown in FIG. 2. At its rearward end the valve-forming sleeve 34 is undercut to provide a groove 40 which defines an annular flange 41, the inner margins of which fit loosely around the rear portion of the barrel 1 and having a cross-sectional contour which is geometrically similar to, and slightly larger than, the cross-sectional contour of the external faces of the nut portion 30 so as to fit loosely therearound when the sleeve 34 is rotated into such position that the internal faces of the skirt or flange 41 are in axial registration with the surfaces of the nut portion 30 substantially as shown in FIG. 7. When in this position of axial registration, the sleeve 34 can be shifted axially rearwardly from the position shown in FIG. 2 to the position shown in FIG. 4. In this latter position, the O-ring 38 comes to rest upon the portion of the barrel 1 which lies between the ports 10 and 33 thereby preventing communication between the ports 33 and the ports 10. Moreover, the length of the sleeve 34 is such that when it is in rearwardly shifted position, as shown in FIG. 4, its forward end will clear the apertures 10 and leave them open to the ambient, so that any pressure which may be trapped within the bore 2 of the hose lines beyond will be relieved.

At its forward end, the valve-forming sleeve 34 is provided with diametrally enlarged annular abutments 42 which are disposed in endwise abutment against the rearwardly presented end face of the skirt 19 on the actuator sleeve 17. Thus, when the valve-forming sleeve 34 is in the position shown in FIG. 2, the actuator sleeve 17 cannot be shifted rearwardly unless the valve-forming sleeve 34 is also shifted rearwardly. Consequently, when the valve-forming sleeve 34 and the actuator sleeve 17 are in the forwardly shifted position, as shown in FIG. 2, the valve-forming sleeve 34 may be rotated from the position shown in FIG. 7 to the position shown in FIG. 6, and, therefore, cannot be accidentally shifted rearwardly. In fact, the valve-forming sleeve 34 can only be shifted rearwardly by being rotated to the position shown in FIG. 7, whereupon the sleeve 34 may be axially shifted in a rearward direction to the position shown in FIG. 4. In this latter position, the actuator sleeve 17 is unblocked, so to speak, and may be manually shifted rearwardly to the position shown in FIG. 8 and manually held in this latter position to permit insertion of a male coupler B, which integrally includes a tubular coupling stem 43 having a diametrally reduced nipple portion 44 adapted to project through the shoulder 7 and fit in seal-forming engagement within the O-ring 9. At the inner end of the nipple portion 44, the stem 43 is provided with an annular shoulder 45 having oppositely presented beveled faces 46, 47, the latter defining the fitted extremity of a retention-groove 48, the rearward end of which is defined by a beveled face 49. The locations of the beveled face 46 and the groove 48 are such that when the stem 43 is fully inserted within the bore 2 of the hose coupling A, the beveled face 46 will abut against the beveled face 6 so that the groove 48 will be aligned with the rest of the balls 13. Thus, when the actuator sleeve 17 is released and shifted forwardly between the spring 21, the balls 13 will be urged radially inwardly and will seat lockingly within the groove 48, holding the stem securely and tightly in coupled position, as shown in FIG. 9. It should also be noted that when the nipple portion 44 is sufficiently short so that when the stem 43 is in coupled position, the nipple portion 44 will not overlie and block the ports 10. It will also be noted, by reference to FIG. 9, that the valve-forming sleeve is in rearwardly shifted or "closed" position at the moment of insertion of the male coupler B into the bore 2 of the hose coupling A, and, therefore, the connection can be easily and readily effected under conditions of "non-pressure" or, in other words, at atmospheric pressure. As soon as the connection has been effected, the valve-forming sleeve 34 can be shifted forwardly into the position shown in FIGS. 1 and 2, thereby establishing communication between the ports 10 and 33.

The fitting 29 is externally threaded for receiving a conventional sleeve-nut s by which a hose h may be attached thereto in the manner shown in FIG. 2.

When the hose h is conventionally connected to a source of air under pressure (not shown) and the valve-forming sleeve 34 is shifted to "open" position, as shown in FIG. 2, air under pressure will flow from the hose h through the bore 3, through the ports 33, and across the channel 37 and thence through the ports 10 and bore 2 into and through the male coupler B. As long as the male coupler B is in connected position and air under pressure is flowing through the hose coupling A in the manner just described, the actuator sleeve 17 cannot be shifted rearwardly to permit disconnection of the male coupler B until the valve-forming sleeve 34 has been shifted rearwardly to a closed position. Furthermore, as above pointed out, the valve-forming sleeve 34 cannot be shifted rearwardly to "closed" position until it is deliberately and intentionally rotated into a position of registration with the nut portion 30. Consequently, when the male coupler B is in connected position and air under pressure is flowing through the hose coupling A, the valve-forming sleeve 34 can be rotated to a position of non-registration such as that shown in FIG. 6. When this is done, the air flow cannot be accidentally shut off and the male coupler B cannot be removed while air under pressure is flowing through the hose coupling A.

If desired, a modified form of hose coupling A' may be provided as shown in FIG. 10. The hose coupling A' is substantially identical in all respects with the previously described hose coupling A, except that the modified form of fitting 29' is used which is similar to the previously described fitting 29 except that it is integrally provided at its rearward end with a tubular stem 50 having a series of axially spaced annular flutes 51. The stem 50 may be pushed into the bore of a suitable piece of hose and secured by a conventional hose clamp or other conventional means (not shown).

It should be understood that changes and modifications in the form, construction, arrangement, and combination of the several parts of the hose couplings may be made and substitiuted for those herein shown and described without departing from the nature and principle of my invention.

Having thus described my invention, what I claim and desire to secure by Letters Patent is:

1. A quick-acting hose coupling for receptive engagement with a mating coupler element, said hose coupling comprising a tubular barrel having two bores separated by an imperforate wall, said bores being respectively in communication near their inner ends with the exterior of the barrel by means of fluid passages extending through the barrel on opposite sides of said wall, valve-forming means operatively mounted on the barrel and adapted for movement between two different positions one of said positions being an open position for establishing communication between said fluid passages on opposite sides of said wall across the exterior of the barrel, the other position being a closed position for interrupting communication between said fluid passages, locking means operatively mounted on the barrel for retentively holding the coupler element in retained engagement within one of said bores and being adapted, upon movement, to release said coupler element, said locking means including a sleeve separate from the valve-forming means whereby the valve-forming means can be moved optionally from closed position to open position and from open position to closed position independently of the locking means, said sleeve being in endwise abutment with the valve-forming means when the valve-forming means is in open position so that, when in such open position, the valve-forming means will prevent unlocking movement of the locking means, and stop-forming means associated with the barrel for optionally precluding unauthorized movement of the valve-forming means from open to closed position.

2. A quick-acting hose coupling for receptive engagement with a mating coupler element, said hose coupling comprising a tubular barrel having two coaxial bores separated by an imperforate wall, said bores being respectively in communication near their inner ends with the exterior of the barrel by means of fluid passages extending through the barrel on opposite sides of said wall, valve-forming means operatively mounted on the barrel and adapted for movement between two different positions one of said positions being an open position for establishing communication between said fluid passages on opposite sides of said wall across the exterior of the barrel, the other position being a closed position for interrupting communication between said fluid passages, locking means operatively mounted on the barrel for retentively holding the coupler element in retained engagement within one of said bores and being adapted, upon movement, to release said coupler element, said locking means including a sleeve separate from the valve-forming means whereby the valve-forming means can be moved optionally from closed position to open position and from open position to closed position independently of the locking means, said sleeve being in endwise abutment with the valve-forming means when the valve-forming means is in open position so that, when in such open position, the valve-forming means will prevent unlocking movement of the locking means, and stop-forming means associated with the barrel for optionally precluding unauthorized movement of the valve-forming means from open to closed position.

3. A quick-acting hose coupling for receptive engagement with a mating coupler element, said hose coupling comprising a tubular barrel having two bores separated by an imperforate wall, said bores being respectively in communication near their inner ends with the exterior of the barrel by means of fluid passages extending through the barrel on opposite sides of said wall, valve-forming means operatively mounted on the barrel and adapted for movement between two different positions one of said positions being an open position for establishing communication between said fluid passages on opposite sides of said wall across the exterior of the barrel, the other position being a closed position for interrupting communication between said fluid passages and at the same time opening one fluid passage to ambient, locking means operatively mounted on the barrel for retentively holding the coupler element in retained engagement within one of said bores and being adapted, upon movement, to release said coupler element, said locking means including a sleeve separate from the valve-forming means whereby the valve-forming means can be moved optionally from closed position to open position and from open position to closed position independently of the locking means, said sleeve being in endwise abutment with the valve-forming means when the valve-forming means is in open position so that, when in such open position, the valve-forming means will prevent unlocking movement of the locking means, and stop-forming means associated with the barrel for optionally precluding unauthorized movement of the valve-forming means from open to closed position.

4. A quick-acting hose coupling for receptive engagement with a mating coupler element, said hose coupling comprising a tubular barrel having two bores separated by an imperforate wall, said bores being respectively in communication near their inner ends with the exterior of the barrel by means of fluid passages extending through the barrel on opposite sides of said wall, valve-forming means operatively mounted on the barrel for axially shiftable and rotative movement between two different positions one of said positions being an open position for establishing communication between said fluid passages on opposite sides of said wall across the exterior of the barrel, the other position being a closed position for interrupting communication between said fluid passages, locking means operatively mounted on the barrel for retentatively holding the coupler element in retained engagement within one of said bores and being adapted, upon movement, to release said coupler element, said locking means including a sleeve separate from the valve-forming means whereby the valve-forming means can be moved optionally from closed position to open position and from open position to closed position independently of the locking means, said sleeve being in endwise abutment with the valve-forming means when the valve-forming means is in open position so that, when in such open position, the valve-forming means will prevent unlocking movement of the locking means, and stop-forming means associated with the barrel for optionally precluding unauthorized movement of the valve-forming means from open to closed position.

5. A quick-acting hose coupling for receptive engagement with a mating coupler element, said hose coupling comprising a tubular barrel having two bores separated by an imperforate wall, said bores being respectively in communication near their inner ends with the exterior of the barrel by means of fluid passages extending through the barrel on opposite sides of said wall, valve-forming means operatively mounted on the barrel for axially shiftable and rotative movement between two different positions one of said positions being an open position for establishing communication between said fluid passages on opposite sides of said wall across the exterior of the barrel, the other position being a closed position for interrupting communication between said fluid passages, locking means operatively mounted on the barrel for retentively holding the coupler element in retained engagement within one of said bores and being adapted, upon movement, to release said coupler element, said locking means including a sleeve separate from the valve-forming means whereby the valve-forming means can be moved optionally from closed position to open position and from open position to closed position independently of the locking means, said sleeve being in endwise abutment with the valve-forming means when the valve-forming means is in open position so that, when in such open position, the valve-forming means will prevent unlocking movement of the locking means, and stop-forming means associated with the barrel for optionally precluding unauthorized movement of the valve-forming means from open to closed position and means associated with the barrel and engageable with the valve-forming means when the latter is rotated away from a predetermined position so as to prevent axial shifting movement of the valve-forming means.

6. A quick-acting hose coupling according to claim 4 in which the valve-forming means is provided with an annular skirt which has an axially presented non-circular opening substantially larger than the proximate portions of the barrel, and wherein the stop-forming means associated with the barrel is located on the closed position side of the barrel with respect to the unperforated wall, and wherein said stop-forming means includes means for optionally fitting axially within the non-circular opening of the annular skirt when the valve-forming means is rotated to an aligned position whereby it can be axially shifted into closed position and the skirt will be shifted into telescopic position over, and around said last-named means.

7. A quick-acting hose coupling according to claim 4 in which the valve-forming means is provided with an annular skirt which has an axially presented hexagonal opening substantially larger than the proximate portions of the barrel, and wherein the stop-forming means associated with the barrel is located on the closed position side of the barrel with respect to the unperforated wall and has a hexagonal peripheral contour of such size and shape as to fit telescopically within the hexagonal opening of the annular skirt when the valve-forming means is rotated to an aligned position whereby it can be axially shifted into closed position and the skirt will be shifted into telescopic position over and around said element.

8. A quick-acting hose coupling according to claim 4 in which the valve-forming means is provided with an annular skirt which has an axially presented three-lobed annular opening substantially larger than the proximate portions of the barrel, and wherein the stop-forming means associated with the barrel is located on the closed position side of the barrel with respect to the unperforated wall, and a three-lobed annular peripheral contour of such size and shape as to fit telescopically within the three-lobed annular opening of the annular skirt when the valve-forming means is rotated to an aligned position whereby it can be axially shifted into closed position and the skirt will be shifted into telescopic position over and around said element.

9. A quick-acting hose coupling according to claim 1 in which the locking means is resiliently biased into position for retention of the coupler element.

10. A quick-acting hose coupling according to claim 1 in which the barrel has an external abutment; the locking means has an annular skirt, the interior surface of which is spaced outwardly from the barrel and abutment; and wherein a spring is operatively mounted within the skirt so as to bias the locking means axially away from the abutment into position for retention of the coupler element.

References Cited in the file of this patent

UNITED STATES PATENTS

| | | |
|---|---|---|
| 4,419 | Clarke | Mar. 14, 1846 |
| 1,850,879 | Hunt | Mar. 22, 1932 |
| 1,944,739 | Hunt | Jan. 23, 1934 |
| 2,509,671 | Christensen | May 30, 1950 |
| 3,106,378 | Hellstern | Oct. 8, 1963 |

FOREIGN PATENTS

| | | |
|---|---|---|
| 724,366 | Great Britain | Feb. 16, 1955 |
| 1,067,517 | France | Jan. 27, 1954 |